United States Patent
Hua et al.

(10) Patent No.: US 11,131,488 B2
(45) Date of Patent: Sep. 28, 2021

(54) OIL SEPARATOR, COMPRESSOR AND AIR CONDITIONER

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Chao Hua, Zhuhai (CN); Tang Zhou, Zhuhai (CN); Yu Zhou, Zhuhai (CN); Yongbin Zhang, Zhuhai (CN); Cui Pan, Zhuhai (CN); Xianquan Liu, Zhuhai (CN); Yaozhen Xie, Zhuhai (CN); Chengwu Huang, Zhuhai (CN); Quanchao Zhao, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 171 days.

(21) Appl. No.: 16/624,304

(22) PCT Filed: Dec. 22, 2017

(86) PCT No.: PCT/CN2017/117995
§ 371 (c)(1),
(2) Date: Dec. 19, 2019

(87) PCT Pub. No.: WO2018/233257
PCT Pub. Date: Dec. 27, 2018

(65) Prior Publication Data
US 2020/0224945 A1      Jul. 16, 2020

(30) Foreign Application Priority Data

Jun. 21, 2017   (CN) .......................... 201710475928.9

(51) Int. Cl.
F25B 43/02      (2006.01)
B01D 45/08      (2006.01)

(52) U.S. Cl.
CPC .............. *F25B 43/02* (2013.01); *B01D 45/08* (2013.01)

(58) Field of Classification Search
CPC ........ F25B 43/02; F25B 43/006; F25B 43/00; F25B 2400/23; F25B 2400/05;
(Continued)

(56) References Cited

U.S. PATENT DOCUMENTS

2006/0196220 A1* 9/2006 Westermeyer .......... F25B 43/02
62/470

FOREIGN PATENT DOCUMENTS

CN      101738034 A     6/2010
CN      201653016 U     11/2010
(Continued)

OTHER PUBLICATIONS

Pdf file attached is the translation of foreign reference CN102538325A (Year: 2012).*

*Primary Examiner* — Len Tran
*Assistant Examiner* — Kamran Tavakoldavani
(74) *Attorney, Agent, or Firm* — Kilpatrick Townsend & Stockton LLP (57) ABSTRACT

Provided are an oil separator, a compressor, and an air conditioner having the same. The oil separator comprises: a casing, which is provided with a gas inlet and a gas outlet, and a first separation structure, which is disposed within the casing, and which is located between the gas inlet and the gas outlet. The first separation structure comprises a first baffle plate and a refrigerant pipeline; the first baffle plate is provided therein with a cooling chamber; the refrigerant
(Continued)

pipeline is connected to the first baffle plate and communicates with the cooling chamber.

20 Claims, 4 Drawing Sheets

(58) Field of Classification Search
CPC .......... F25B 2400/051; F25B 2400/053; F25B 2400/02; F25B 2500/16; F04C 29/026; B01D 17/0211; B01D 17/042
USPC .............................................. 96/188; 55/414
See application file for complete search history.

(56) References Cited

FOREIGN PATENT DOCUMENTS

| | | | | |
|---|---|---|---|---|
| CN | 102221274 A | | 10/2011 | |
| CN | 102538325 A | * | 7/2012 | .............. F25B 43/02 |
| CN | 102538325 A | | 7/2012 | |
| CN | 203798043 U | | 8/2014 | |
| CN | 105221469 A | | 1/2016 | |
| CN | 107192182 A | | 9/2017 | |
| JP | 2010084954 A | | 4/2010 | |
| KR | 20090081320 A | | 7/2009 | |

* cited by examiner

OIL SEPARATOR, COMPRESSOR AND AIR CONDITIONER

CROSS-REFERENCE TO RELATED APPLICATION

This application is a U.S. National Stage of International Application No. PCT/CN2017/117995, filed on Dec. 22, 2017, which claims priority to Chinese Patent Application No. 201710475928.9, filed with the Chinese Patent Office on Jun. 21, 2017, the contents of which are hereby incorporated by reference in their entireties.

TECHNICAL FIELD

The disclosure relates to the field of refrigeration equipment, and in particular, to an oil separator, a compressor, and an air conditioner having the same.

BACKGROUND

When centrifugal compressor works, mechanical movement (such as oil pump agitation, rotor movement, gear meshing movement, etc.) and sealed high-pressure gas continuously cause the internal gas pressure of the compressor to rise. It is necessary to connect inside and outside of the compressor by connecting pipe to balance the internal gas pressure. However, when the internal gas refrigerant passes through the connecting pipe, it will carry the gaseous lubricating oil which, if not separated, will flow to the outside of the compressor, namely the "oil escaping" will occur. The "oil escaping", for one thing, will cause the suction gas of the unit to carry liquid and thus reduce the life of the impeller; for another thing, the oil escaping will lower the level of lubricating oil, disable the bearing and other parts to be lubricated, and thus aggravating the wear. Therefore, a separate oil component is often provided before the connecting pipe to isolate the gaseous lubricating oil.

Figure 1:
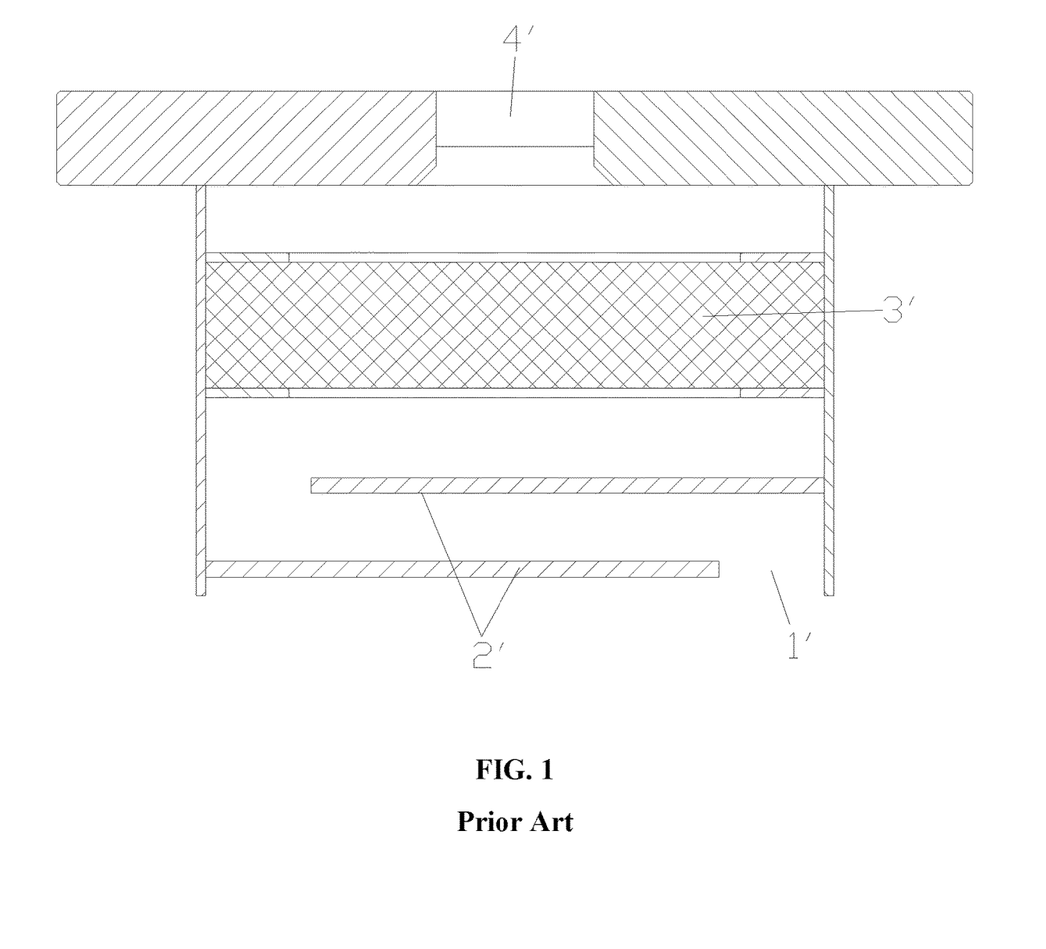
FIG. 1 is a structural schematic diagram illustrating an oil separator in the prior art.

Oil separators can be categorized into built-in oil separators and external oil separators. The separation method can be categorized into slow-down collision type, centrifugal type, filtration type, and condensation type. The slow-down collision type and the centrifugal type usually serve as a first stage separation method, and the filtration separation usually serves as a second stage separation. The structure of two-stage oil separator in a centrifugal compressor in the prior art is shown in FIG. 1. When the compressor works, the mixed gas carrying lubricating oil enters the separator from the gas inlet port 1', and collides with the baffle plate 2', thus the kinetic energy of the mixed gas decreases, and part of the lubricate oil is blocked. Till now the first stage separation is completed. In the second stage separation, the mixed gas with a lower speed enters the gas-liquid filter net 3', and then the oil droplets gather and become bigger due to catching and collecting function of the filter net and drop down by gravity, and the gas continues to rise and finally reaches the gas outlet port 4'.

However, when the amount of the mixed gas is larger and the flow rate is smaller, the collision separation effect of the two baffle plates 2' is reduced. At this time, a large amount of gas carrying lubricating oil flows axially through the gas-liquid filter net 3', and the oil droplets will be scattered by the subsequent gas before gathering. Finally, the lubricating oil flows out of the compressor along with the gas, causing an oil escaping phenomenon.

SUMMARY

The main objective of the present disclosure is to provide an oil separator, a compressor, and an air conditioner having the same to address the problem of oil escaping phenomenon in the prior art.

In order to achieve the above objective, according to an aspect of the present disclosure, an oil separator is provided, which includes: a casing having a gas inlet and a gas outlet; and a first separation structure, provided inside the casing (10) and located between the gas inlet and the gas outlet; the first separation structure comprises a first baffle plate and a refrigerant pipeline; the first baffle plate has a cooling chamber therein; the refrigerant pipe is connected to the first baffle plate and in communication with the cooling chamber.

Further, the first baffle plate is in a shape of a cone wide at a bottom and narrow at a top.

Further, a fluid passing structure is provided in the first baffle plate and/or between the first baffle plate and an inner wall of the casing.

Further, the fluid passing structure comprises a fluid passing hole provided in the first baffle plate.

Further, the fluid passing hole is provided in a middle part of the first baffle plate, and the cooling chamber is an annular chamber.

Further, the fluid passing structure further includes an oil passage arranged between the first baffle plate and the inner wall of the casing.

Further, a notch structure is provided at an edge of the first baffle plate, and the oil passage is formed between the notch structure and the inner wall of the casing.

Further, the oil separator further includes: a second separation structure provided within the casing and located between the gas inlet and the gas outlet, and located on at least one side of the first separation structure.

Further, the second separation structure includes a second baffle plate located above the first baffle plate, and a first flow channel is formed between an outer edge of the second baffle plate and an inner wall of the casing.

Further, the second baffle plate is in a shape of a cone wide at a bottom and tapered at a top.

Further, the second separation structure further includes a third baffle plate; third baffle plate is located below the first baffle plate, and a second flow channel is formed between an outer edge of the third baffle plate and an inner wall of the casing.

Further, the third baffle plate is in a shape of a cone wide at a top and narrow at a bottom.

Further, the third baffle plate is provided with an oil hole therein.

Further, the oil hole is provided in a middle part of the third baffle plate.

Further, the oil separator further includes: a third separation structure, provided within the casing, located between the inlet and the outlet, and arranged above the first separation structure and the second separation structure.

Further, the casing includes a cylindrical housing and a connecting flange arranged at a first end of the cylindrical housing, wherein the gas outlet is arranged in the connecting flange, and the gas inlet is formed at a second end of the cylindrical housing.

According to another aspect of the disclosure, a compressor is provided, which includes the oil separator described above.

According to yet another aspect of the disclosure, an air conditioner is provided, which includes a compressor, the compressor includes the oil separator described above.

In the technical solutions of the present disclosure, when the mixed gas of refrigerant and lubricating oil enters the casing from the gas inlet, the first baffle plate stops the gas, thereby reducing the kinetic energy of the motion of the mixed gas. At the same time, the refrigerant in the cooling chamber can cool the mixed gas, so that the gaseous lubricating oil is cooled to be oil droplets, thereby improving the separation effect and preventing oil escaping. Therefore, the technical solutions of the embodiment address the problem of oil escaping in the oil separator in the prior art.

BRIEF DESCRIPTION OF THE DRAWINGS

The accompanying drawings, which form part of this application, are intended to enable a further understanding of the present disclosure, and the exemplary embodiments of the present disclosure and the descriptions thereof are intended to explain the present disclosure, and do not constitute a limitation to the present disclosure. In the drawings.

The drawings include the following reference numerals: 1' gas inlet port; 2' baffle plate; 3' gas-liquid filter net; 4' gas outlet port; 10 casing; 11 gas inlet; 12 gas outlet; 13 cylindrical housing; 14 connecting flange; 20 first separation structure; 21 first baffle plate; 211 cooling chamber; 212 fluid passing hole; 22 refrigerant pipeline; 221 refrigerant inlet pipe; 222 refrigerant outlet pipe; 213 notch structure; 30 oil passage; 40 second separation structure; 41 second baffle plate; 42 third baffle plate; 421 oil hole; 50 first flow channel; 60 second flow channel; 70 third separation structure; 71 gas-liquid filter net.

DETAILED DESCRIPTION OF THE EMBODIMENTS

It should be noted that, the embodiments and the features in the embodiments of this application may be combined with each other if no conflicts occur. The present disclosure will be described in detail below with reference to the accompanying drawings and in conjunction with embodiments.

The technical solutions in the embodiments of the present disclosure will be clearly and completely described hereafter with reference to the accompanying drawings in the embodiments of the present disclosure. Apparently, the embodiments in the description are merely some embodiments, but not all embodiments of the present disclosure. In fact, the following description of at least one exemplary embodiment is merely illustrative, but not intended to limit the present disclosure and the application or the use thereof. Based on the embodiments of the present disclosure, other embodiments obtained by a person of ordinary skill in the art without creative efforts all fall within the protection scope of the present disclosure.

It should be noted that the terminology used herein is merely intended to describe specific embodiments but not intended to limit the exemplary embodiments according to the present disclosure. Unless the context expressly indicates, otherwise the singular form used hereafter is intended to include the plural form, and it should be understood that the terms "include" and/or "comprise" used in this specification specify the presence of features, steps, operations, devices, components and/or combinations thereof.

Figure 2:
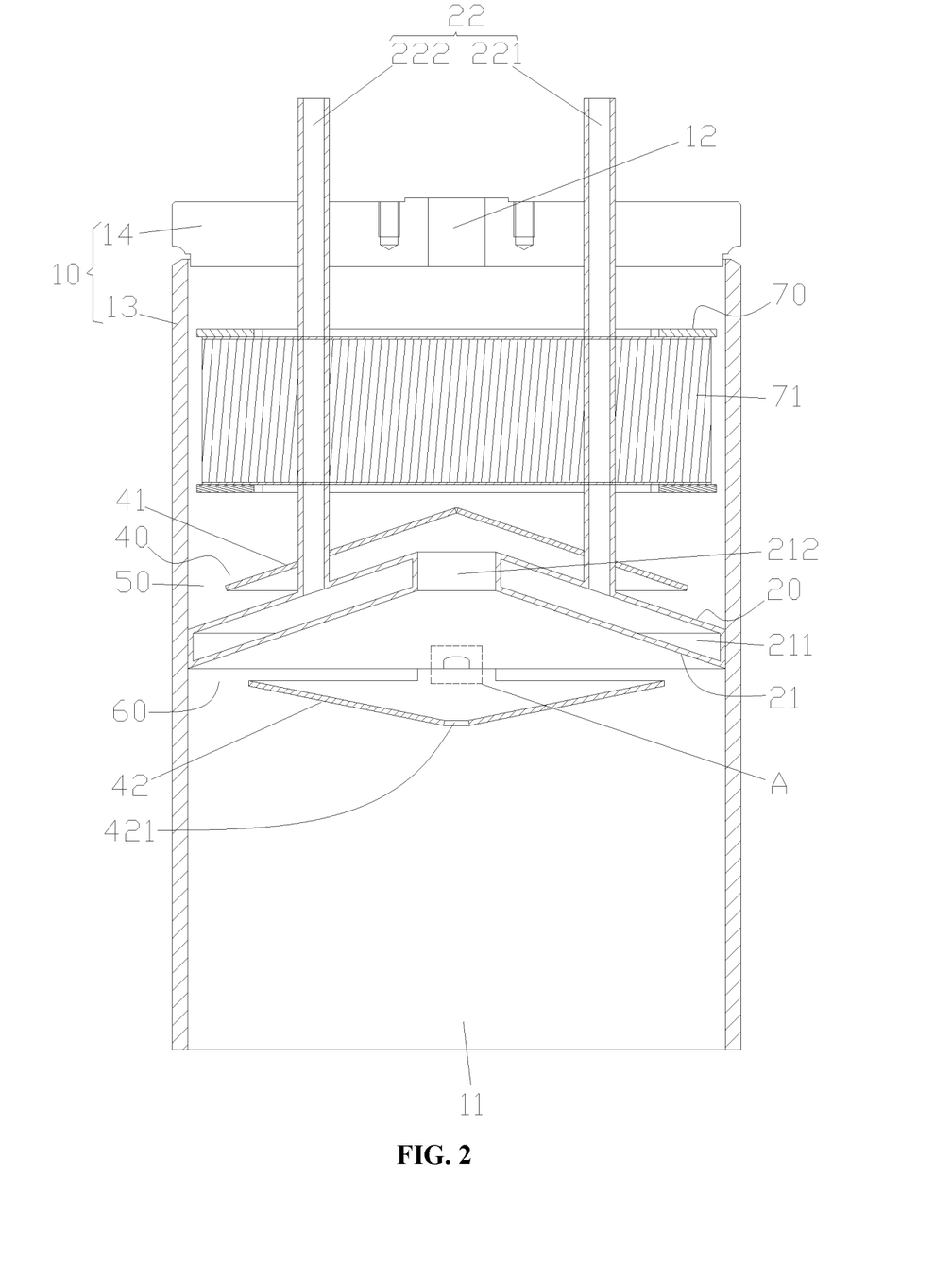
FIG. 2 is a schematic diagram illustrating an embodiment of an internal structure of an oil separator according to the present disclosure.

As shown in FIG. 2, the oil separator of the embodiment includes a casing 10 and a first separation structure 20. The casing 10 has a gas inlet 11 and a gas outlet 12. The first separation structure 20 is provided inside the casing 10 and located between the gas inlet 11 and the gas outlet 12. The first separation structure 20 includes a first baffle plate 21 and a refrigerant pipeline 22. The first baffle plate 21 has a cooling chamber 211; the refrigerant pipeline 22 is connected to the first baffle plate 21 and in communication with the cooling chamber 211; and a fluid passing structure is provided in the first baffle plate 21 and/or between the first baffle plate 21 and an inner wall of the casing 10.

In a technical solution of the embodiment, when the mixed gas of refrigerant and lubricating oil enters the casing 10 from the gas inlet 11, the first baffle plate 21 stops the gas, thereby reducing the kinetic energy of the motion of the mixed gas. At the same time, the refrigerant in the cooling chamber 211 can cool the mixed gas, so that the gaseous lubricating oil is cooled to be oil droplets, thereby improving the separation effect and preventing oil escaping. Therefore, the technical solution of the embodiment addresses the problem of oil escaping in the oil separator in the prior art.

It should be noted that, as can be seen from FIG. 2, in this embodiment, the first baffle plate 21 has a certain thickness, so as to facilitate the arrangement of the cooling chamber 211 inside the first baffle plate 21. When the mixed gas flows through the first baffle plate 21, the first baffle plate 21 stops the mixed gas, and the mixed gas flows out from the fluid passing structure to the gas outlet 12.

As shown in FIG. 2, in the technical solution of this embodiment, the first baffle plate 21 is in a shape of a cone wide at the bottom and narrow at the top. The cone wide at the bottom and narrow at the top means that a distance between the middle part of the first baffle plate 21 and the gas outlet 12 is greater than a distance between the edge of the first baffle plate 21 and the gas outlet 12.

That is, the opening of the cone faces the gas inlet 11. When the gas passes through the first baffle plate 21 upwards, the described structure enables some of the lubricating oil to condense into oil droplets on a lower surface of the first baffle plate 21. Subsequently, the droplets drop along the lower surface of the tapered structure by gravity and then flow out from the gas inlet 11.

As shown in FIG. 2, in the technical solution of this embodiment, the fluid passing structure includes a fluid passing hole 212 provided in the first baffle plate 21. Specifically, when the mixed gas flows to the first baffle plate 21, the gas flows through the fluid passing hole 212 to reach the gas outlet 12.

As shown in FIG. 2, in the technical solution of this embodiment, the fluid passing hole 212 is provided in the middle part of the first baffle plate 21, and the cooling cavity 211 is an annular cavity. Specifically, the fluid passing hole 212 is provided in the middle part of the first baffle plate 21, so that the mixed gas can transfer heat uniformly through the first baffle plate 21. Moreover, the cooling chamber 211 is an annular chamber, and the refrigerant pipeline 22 includes a refrigerant inlet pipe 221 and a refrigerant outlet pipe 222. As can be seen from FIG. 2, the cooling chamber 211 surrounds the outside of the fluid passing hole 212. The refrigerant inlet pipe 221 and the refrigerant outlet pipe 222 are respectively arranged on opposite two sides of the fluid passing hole 212, which makes the flow path of the refrigerant longer and the heat exchange effect better. As can be seen from FIG. 2, after the refrigerant from the refrigerant inlet pipe 221 enters the cooling chamber 211, the refrigerant flows along both sides and finally flows out from the refrigerant outlet pipe 222.

Figure 3:
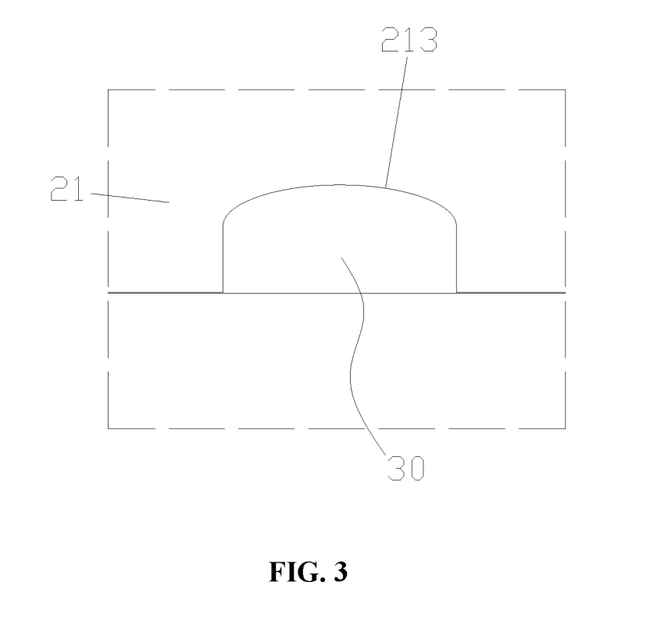
FIG. 3 is an enlarged schematic diagram of A in FIG. 2.

As shown in FIGS. 2 and 3, in the technical solution of this embodiment, the fluid passing structure further includes an oil passage 30 provided between the first baffle plate 21 and the inner wall of the casing 10. Specifically, a gap is provided between the side edge of the first baffle plate 21 and the inner wall of the casing 10 to form the described oil passage 30. Specifically, when the gaseous lubricating oil in the mixed gas over the upper side of the first baffle plate 21 condenses into oil droplets, the oil droplets drop onto the upper surface of the first baffle plate 21 and then fall down along the slope surface of the first baffle plate 21 by gravity, and finally flow through the oil passage 30 to reach the gas inlet 11. As can be seen from FIGS. 2 and 3, a notch structure 213 is provided at the edge of the first baffle plate 21, and the notch structure 213 and the inner wall of the casing 10 enclose and define the described oil passage 30. Further, the notch structure 213 is an n-shaped notch.

As shown in FIG. 2, in the technical solution of this embodiment, the oil separator further includes a second separation structure 40. The second separation structure 40 is provided inside the casing 10 and located between the gas inlet 11 and the gas outlet 12, and the second separation structure 40 is arranged on at least one side of the first separation structure 20. Specifically, the second separation structure 40 is arranged on at least one side of the first separation structure 20 to block the mixed gas, thereby reducing the kinetic energy of the motion of the gas.

As shown in FIG. 2, in the technical solution of this embodiment, the second separation structure 40 includes a second baffle plate 41; the second baffle plate 41 is located above the first baffle plate 21; and a first flow channel 50 is formed between an outer edge of the second baffle plate 41 and an inner wall of the casing 10. Optionally, the second baffle plate 41 is in a shape of a cone wide at the bottom and tapered at the top. Specifically, the second baffle plate 41 is arranged above the first baffle plate 21 and configured to block the mixed gas.

As shown in FIG. 2, in the technical solution of this embodiment, the second separation structure 40 further includes a third baffle plate 42; the third baffle plate 42 is located below the first baffle plate 21; and a second flow channel 60 is formed between the outer edge of the third baffle plate 42 and the inner wall of the casing 10. The third baffle plate 42 is in a shape of a cone wide at the top and narrow at the bottom. Further, the third baffle plate 42 is provided with an oil hole 421. The oil hole 421 is located in the middle part of the third baffle plate 42. Specifically, the condensed oil droplets on the surface of the third baffle plate 42 fall down to the oil passage hole 421 and are discharged to the gas inlet 11 by gravity. The described first baffle plate 21, the second baffle plate 41, and the third baffle plate 42 enclose and form a bending passage, so that the kinetic energy of the motion is greatly reduced after the mixed gas passes through the bending passage. The first baffle plate 21, the second baffle plate 41, and the third baffle plate 42 can block the oil droplets and make them flow back to the oil tank.

Optionally, as can be seen from FIGS. 2 and 3, an oil guide plate is provided at the edge of the third baffle plate 42. One end of the oil guide plate is connected to the edge of the third baffle plate 42, and another end is arranged below the notch structure 213. Such a structure is provided that, after the oil on the upper surface of the first baffle plate 21 flows down to the notch structure 213, the oil is guided by the oil guide plate to flow to the third baffle plate 42, and finally the oil flows through the oil passage hole 421 and flows back to the oil tank. This structure enables the oil on both the first baffle plate 21 and the third baffle plate 42 to flow out from the oil hole 421, thereby facilitating the provision of a return structure that matches the oil tank.

As shown in FIG. 2, in the technical solution of this embodiment, the oil separator further includes a third separation structure 70. The third separation structure 70 is provided inside the casing 10 between the gas inlet 11 and the gas outlet 12, and the third separation structure 70 is arranged above the first separation structure 20 and the second separation structure 40. Optionally, the third separation structure 70 in this embodiment is a gas-liquid filter net 71, and the gas-liquid filter net 71 is configured to further separate the lubricating oil from the refrigerant.

As shown in FIG. 2, in the technical solution of this embodiment, the casing 10 includes a cylindrical housing 13 and a connecting flange 14 arranged at a first end of the cylindrical housing 13; the gas outlet 12 is arranged in the connecting flange 14; and a second end of the cylindrical housing 13 forms the gas inlet 11. Specifically, the refrigerant inlet pipe 221 and the refrigerant outlet pipe 222 are both fixed to the connecting flange 14.

The present disclosure further provides a compressor. The compressor of the embodiment of the present disclosure includes an oil separator, and the oil separator is the oil separator described above.

The present disclosure further provides an air conditioner. The air conditioner of an embodiment of the present disclosure includes a compressor, and the compressor is the compressor described above.

According to the structure above, the oil separator of the present disclosure has following features:

The third baffle plate 42 is a metal baffle plate in a shape of a funnel. The baffle plate is a non-standard part and is made of a metal with favorable thermal conductivity. The taper degree is decided by situations and actual demands. A small hole is disposed at the bottom of the funnel, which is configured to allow the oil droplets to flow back to the oil tank.

The first baffle plate 21 is a metal heat exchanger in a shape of an inverted funnel. The first baffle plate is hollow and allows circulation of refrigerant medium therein. Two pipes are extended from the upper surface of the inverted funnel-shaped metal heat exchanger, so that the refrigerant medium can be introduced into the heat exchanger for heat exchange.

The second baffle plate 41 is a metal baffle plate in a shape of a tapered cap. The baffle plate is a non-standard part and is made of a metal with favorable thermal conductivity. The taper degree decided by situations and actual demands.

The cylindrical housing 13 is in a cylindrical shape and is hollow, and is configured to support the parts.

The gas-liquid filter net 71 is configured to block the oil droplets and allow the gas to pass.

The connecting flange 14 is the top cover of the cylindrical housing 13 and is connected to a balance pipe to guide the filtered gas refrigerant to flow into the compressor.

As shown in FIG. 2, the third baffle plate 42 is arranged below the first baffle plate 21; the second baffle plate 41 is arranged below the first baffle plate 21; the gas-liquid filter net 71 is arranged above the second baffle plate 41, and the connecting flange 14 is arranged at the top finally. The cylindrical housing 13 encloses these parts, and a special passage as shown in FIG. 2 is formed among these parts.

Figure 4:
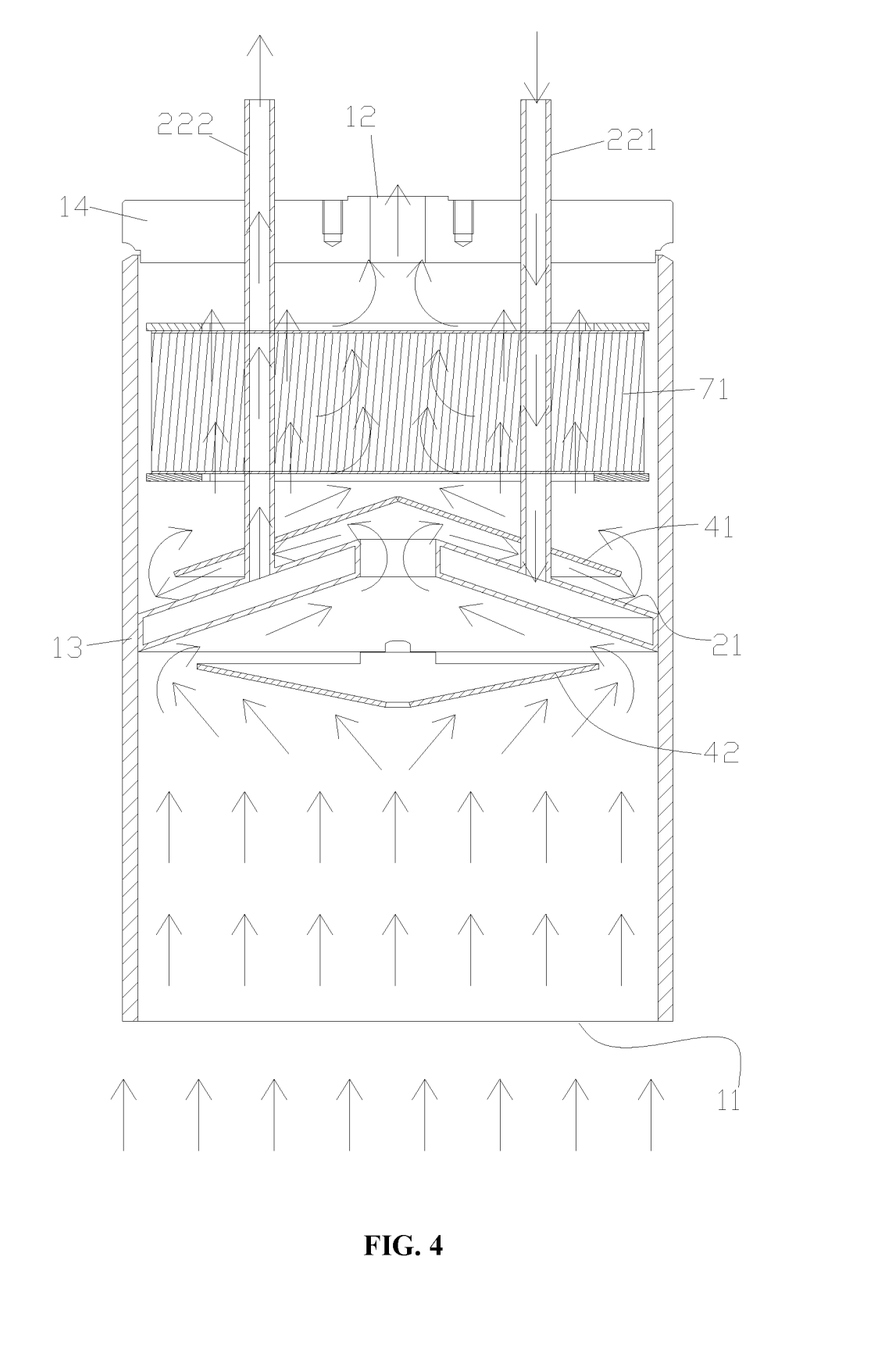
FIG. 4 is a schematic diagram illustrating a circulation of gas refrigerant in the oil separator in FIG. 2.

As shown in FIG. 4, when the mixed gas of refrigerant and oil enters the device, in a first step, the mixed gas impacts on the third baffle plate 42, and the third baffle plate 42 blocks the mixed gas, reduces the kinetic energy of the motion of the mixed gas, and changes the motion direction of the mixed gas, thereby increasing the movement distance of the mixed gas and also preventing the gas from directly rushing upward. In this case, some oil droplets in the mixed gas adhere to the outer side wall of the third baffle plate 42 due to the barrier effect, and then flow back to the oil tank along the side wall.

In a second step, after passing the third baffle plate 42, the mixed gas impacts on the lower wall of the first baffle plate 21 once again and is blocked by the first baffle plate 21; the mixed gas bounces and enters a large buffer space formed between the third baffle plate 42 and the first baffle plate 21, and the rapid mixed gas suddenly slows down in this large buffer space. The energy of the mixed gas is rapidly released and the speed becomes slow. Then heat exchange is executed in the heat exchanger, and the heat quantity of the mixed gas decreases rapidly in this buffer space. As the boiling point of the oil is higher than that of the refrigerant, the oil droplets are greatly liquefied in the heat exchange process. The liquefied oil droplets adhere to the side walls of the third baffle plate 42 and the first baffle plate 21, and flow back to the oil tank along the side wall.

The oil droplets collected at the side wall of the third baffle plate 42 flow back to the oil tank from the small hole in the bottom of the funnel, and the oil droplets collected on the side wall of the first baffle plate 21 flow back to the oil tank along the side wall of the cylinder.

In a third step, there is always mixed gas slipping away. After being cooled, the mixed gas continues to move forward to flow out from the small hole in the top of the funnel heat exchanger without being cooled by the funnel heat exchanger, but the mixed gas is blocked back by the second baffle plate 41. Next, the mixed gas flows through the passage formed by the upper sidewall of the first baffle plate 21 and the lower sidewall of the second baffle plate 41. During the circulation process, the heat exchanger further cools the mixed gas through heat exchange, and the cooled oil droplets are liquefied and adhere to the upper side wall of the first baffle plate 21 and the lower side wall of the second baffle plate 41. As more and more oil droplets gather on the lower side wall of the second baffle plate 41, under the action of gravity, the oil droplets fall to the upper side wall of the first baffle plate 21; the oil droplets adhered to the upper side wall of the first baffle plate 21 flow to the junction of the edge of the upper side wall of the first baffle plate 21 and the cylinder along the slope of the heat exchanger; The small hole is provided at the junction, to allow the collected oil droplets to flow back to the oil tank below the funnel.

In a fourth step, much gas oil in the cooled mixed gas has already been liquefied into small oil droplets, which are floating in the gas under the action of the gas and required to pass through the gas-liquid filter net 71 at last. Filtered by the gas-liquid filter net 71, small oil droplets mixed in the gas refrigerant adhere to the filter network, thereby forming larger oil droplets, and under the action of the gravity, the larger oil droplets drop to a lower funnel baffle plate and flow back to the oil tank along the slope side wall. The gaseous refrigerant flows through the gas-liquid filter net to reach the flange inlet at the top, and then flows to the compressor or other places along the pipeline connected with the flange.

After these steps, the refrigerant and the lubricating oil have been separated from the mixed gas through three stages of separation: blocking separation, cooling separation, and filtration separation, and the separation effects of such a structure are remarkable.

The oil separator of the present disclosure has the following advantages:

1. Addressing the problem of unremarkable separation effect of separating the lubricating oil from the gas refrigerant of a centrifugal compressor;
2. Solving the problem of the suction gas carrying liquid in the unit caused by oil escaping;
3. Addressing the problem of heat transfer efficiency reduced by the lubricating oil mixed in the heat exchanger such as an evaporator, a condenser and etc.;
4. Reducing the probability of the suction gas carrying fluid in the unit, reducing the difficulties in checking abnormalities, and improving the reliability of the unit;
5. Ensuring sufficient lubricating oil in the box and improving the working environment of the bearing;
6. Reducing the content of the lubricating oil in the refrigerant, ensuring the performance of refrigerant and improving the service life of the refrigerant;
7. Ensuring the period of filling lubricating oil after sale, so that the lubricating oil have the expected service life;
8. Reducing the temperature of the gas refrigerant and improving the economic efficiency of supplementing gas by a balance pipe.

Unless otherwise specified, the relative arrangements of the components and steps, numeric expressions and values described in these embodiments are not intended to limit the scope of the disclosure. Furthermore, it should be understood that, for convenience of description, the dimensions of the parts shown in the accompanying drawings are not drawn to scale according to the actual proportion. The technologies, methods and equipment known to those of ordinary skill in the art may not be discussed in detail, but, where appropriate, the technologies, the methods and the equipment shall be considered as part of the granted specification. In all the examples shown and discussed herein, any specific value should be interpreted as merely an example, but not as a limitation. Other examples of illustrative embodiments may therefore have different values. It should be noted that similar reference numerals and letters in the following figures denote similar terms, therefore once a particular term is defined in one of the figures, no further discussion is required in the subsequent figures.

In the description of the application, it should be understood that the directional or positional relationships indicated by the terms "front", "back", "upper", "lower", "left", "right", "horizontal", "vertical", "horizontal", "top", and "bottom", are usually based on the directional or positional relationships shown in the accompanying drawings, and used only for the purpose of facilitating the description of the application and simplifying the description, and that, in the absence of the opposite description, these terms indicating directions do not indicate and imply that the related devices or elements must have a specific direction or be constructed and operated in a specific direction, and are not intended to limit the scope of the application; and the terms "inside" and "outside" refer to the inside and the outside of the outline of each component.

For the convenience of description, terms of spatial relations such as "above", "over", "on a top surface", "upper", etc., may be used herein to describe the spatial position relationships of a device or a feature with other devices or features shown in the drawings. It should be understood that the terms of spatial relations are intended to include other different orientations in use or operation in addition to the orientation of the device described in the drawings. For example, if the device in the drawings is placed upside down, the device described as "above other devices or structures" or "over other devices or structures" will be positioned as "below other devices or structures" or "under other devices or structures". Thus, the exemplary term "above" may include both "above" and "below". The device can also be positioned in other different ways (rotating 90 degrees or at other orientations), and the corresponding explanations for the description of the spatial relations will be provided herein.

In addition, it should be noted that the terms such as "first" and "second" used to define components are merely intended to facilitate the distinction between the corresponding components, if not otherwise stated, the terms have no special meaning, and therefore cannot be understood to limit the protection scope of this application.

What described above are merely embodiments of the present disclosure, and are not intended to limit the present disclosure. For those skilled in the art, various modifications and improvements can be made for the present disclosure. Any modifications, equivalent substitutions or improvements made within the spirit and principles of the present disclosure are within the protection scope of the present disclosure.

What is claimed is:

1. An oil separator, comprising:
   a casing, having a gas inlet and a gas outlet; and
   a first separation structure, provided inside the casing and located between the gas inlet and the gas outlet; wherein, the first separation structure comprises a first baffle plate and a refrigerant pipeline; the first baffle plate has a cooling chamber therein; the refrigerant pipe is connected to the first baffle plate and in communication with the cooling chamber.

2. The oil separator according to claim 1, wherein the first baffle plate is in a shape of a cone wide at a bottom and narrow at a top.

3. The oil separator according to claim 1, wherein a fluid passing structure is provided in the first baffle plate and between the first baffle plate and an inner wall of the casing.

4. The oil separator according to claim 3, wherein the fluid passing structure comprises a fluid passing hole provided in the first baffle plate.

5. The oil separator according to claim 4, wherein the fluid passing hole is provided in a middle part of the first baffle plate, and the cooling chamber is an annular chamber.

6. The oil separator according to claim 3, wherein the fluid passing structure further comprises an oil passage arranged between the first baffle plate and the inner wall of the casing.

7. The oil separator according to claim 6, wherein a notch structure is provided at an edge of the first baffle plate, and the oil passage is formed between the notch structure and the inner wall of the casing.

8. The oil separator according to claim 1, further comprising a second separation structure, wherein the second separation structure is provided inside the casing, located between the gas inlet and the gas outlet, and located on at least one side of the first separation structure.

9. The oil separator according to claim 8, wherein the second separation structure comprises a second baffle plate; the second baffle plate is located above the first baffle plate; and a first flow channel is formed between an outer edge of the second baffle plate and an inner wall of the casing.

10. The oil separator according to claim 9, wherein the second baffle plate is in a shape of a cone wide at a bottom and tapered at a top.

11. The oil separator according to claim 8, wherein the second separation structure further comprises a third baffle plate; the third baffle plate is located below the first baffle plate; and a second flow channel is formed between an outer edge of the third baffle plate and an inner wall of the casing.

12. The oil separator according to claim 11, wherein the third baffle plate is in a shape of a cone wide at a top and narrow at a bottom.

13. The oil separator according to claim 12, wherein the third baffle plate is provided with an oil hole therein.

14. The oil separator according to claim 13, wherein the oil hole is provided in a middle part of the third baffle plate.

15. The oil separator according to claim 8, further comprising:
   a third separation structure, provided inside the casing, located between the gas inlet and the outlet, and arranged above the first separation structure and the second separation structure.

16. The oil separator according to claim 1, wherein the casing comprises a cylindrical housing and a connecting flange arranged at a first end of the cylindrical housing; the gas outlet is arranged in the connecting flange; and the gas inlet is formed at a second end of the cylindrical housing.

17. A compressor, comprising the oil separator of claim 1.

18. An air conditioner, comprising the compressor of claim 17.

19. The oil separator according to claim 1, wherein a fluid passing structure is provided in the first baffle plate or between the first baffle plate and an inner wall of the casing.

20. The oil separator according to claim 15, wherein the third separation structure is a gas-liquid filter net.

* * * * *